United States Patent
Li et al.

(10) Patent No.: US 9,438,075 B2
(45) Date of Patent: Sep. 6, 2016

(54) MOTOR STATOR AND MOTOR

(75) Inventors: Hu Li, Osaka (JP); Yuichi Yoshikawa, Osaka (JP); Yukihiro Okada, Osaka (JP); Minoru Chamura, Osaka (JP); Tooru Nakamaru, Osaka (JP); Yasuji Echizen, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 282 days.

(21) Appl. No.: 13/983,262

(22) PCT Filed: Feb. 2, 2012

(86) PCT No.: PCT/JP2012/000697
§ 371 (c)(1),
(2), (4) Date: Sep. 16, 2013

(87) PCT Pub. No.: WO2012/105261
PCT Pub. Date: Aug. 9, 2012

(65) Prior Publication Data
US 2014/0009031 A1 Jan. 9, 2014

(30) Foreign Application Priority Data
Feb. 3, 2011 (JP) .................. 2011-021334

(51) Int. Cl.
*H02K 1/18* (2006.01)
*H02K 1/14* (2006.01)

(52) U.S. Cl.
CPC .............. *H02K 1/146* (2013.01); *H02K 1/148* (2013.01); *H02K 1/18* (2013.01); *H02K 1/185* (2013.01)

(58) Field of Classification Search
CPC ........ H02K 1/18; H02K 1/182; H02K 1/185; H02K 1/187; H02K 1/14; H02K 1/146; H02K 1/148; H02K 1/16; H02K 1/141
USPC .................. 310/216.136, 216.137, 216.043, 310/216.029, 216.044, 216.061, 216.088, 310/216.008, 216.007, 216.109
See application file for complete search history.

(56) References Cited

U.S. PATENT DOCUMENTS

| | | | |
|---|---|---|---|
| 5,859,486 A | | 1/1999 | Nakahara et al. |
| 6,121,711 A | * | 9/2000 | Nakahara ................. H02K 1/14 242/432.3 |

(Continued)

FOREIGN PATENT DOCUMENTS

| | | |
|---|---|---|
| CN | 1104810 | 7/1995 |
| CN | 1310507 A | 8/2001 |

(Continued)

OTHER PUBLICATIONS

Yukitake Yasuhiro, Stator Core, Dec. 18, 2008, JTEKT Corp, JP 2008306859.*

(Continued)

*Primary Examiner* — Terrance Kenerly
*Assistant Examiner* — Alexander Singh
(74) *Attorney, Agent, or Firm* — Brinks Gilson & Lione

(57) ABSTRACT

A motor stator of the invention is provided with a laminated stator core comprising a plurality of core pieces having teeth and linked by intermediate thin-wall portions. The thin-wall portions are bent to form the stator core into an annular shape with two ends of the stator core joined by welding, and slots are formed between adjoining pairs of the teeth. A welded portion of the stator core is not near a center line in a radial direction of any of the slots.

6 Claims, 5 Drawing Sheets

(56) References Cited

U.S. PATENT DOCUMENTS

| | | | |
|---|---|---|---|
| 7,342,343 B2* | 3/2008 | Asao | H02K 15/0006 310/216.004 |
| 2001/0030483 A1 | 10/2001 | Masumoto et al. | |
| 2003/0020358 A1 | 1/2003 | Masumoto et al. | |
| 2003/0020359 A1 | 1/2003 | Masumoto et al. | |
| 2006/0049713 A1 | 3/2006 | Toide et al. | |
| 2007/0096587 A1* | 5/2007 | Ionel et al. | 310/218 |
| 2009/0195110 A1 | 8/2009 | Miyake et al. | |
| 2010/0117478 A1 | 5/2010 | Sun et al. | |
| 2010/0141059 A1* | 6/2010 | Nishimura | 310/44 |
| 2011/0180216 A1 | 7/2011 | Miyake et al. | |

FOREIGN PATENT DOCUMENTS

| | | |
|---|---|---|
| CN | 101494396 A | 7/2009 |
| CN | 101510700 | 8/2009 |
| JP | 07-067273 A | 3/1995 |
| JP | 2000-069693 A | 3/2000 |
| JP | 2001-304123 A | 10/2001 |
| JP | 2002-095193 A | 3/2002 |
| JP | 2006-087278 A | 3/2006 |
| JP | 2008-011675 A | 1/2008 |
| JP | 2008-306859 A | 12/2008 |
| JP | 2008306859 A * | 12/2008 |
| JP | 2009-033874 A | 2/2009 |
| JP | 2010-178487 A | 8/2010 |
| JP | 2011-010548 A | 1/2011 |

OTHER PUBLICATIONS

International Search Report for International Application No. PCT/JP2012/000697, dated Apr. 24, 2012, 2 pages.

English language translation of Search Report in corresponding Chinese Application No. 201280007403.8, dated Mar. 20, 2015, 3 pages.

English language translation of Search Report in corresponding Chinese Application No. 201280007403.8, dated Apr. 5, 2016, 3 pages.

* cited by examiner

MOTOR STATOR AND MOTOR

This application is a 371 application of PCT/JP2012/000697 having an international filing date of Feb. 2, 2012, which claims priority to JP2011-021334 filed Feb. 3, 2011, the entire contents of which are incorporated herein by reference.

TECHNICAL FIELD

The present invention relates to a stator of a permanent-magnet brushless motor and a motor.

BACKGROUND ART

As conventional motor stators designed to enhance yield of a core material used for manufacturing laminated cores, one of the structures hitherto known is made of strip-like core members die-cut from the core material which are laminated, changed into an annular shape after a coil is wound on the strip-like core members, and two ends of which are joined by welding (refer to patent literature 1, for example).

FIG. 5 is a plan view of a stator core of a conventional permanent-magnet brushless motor after the stator core is bent. Stator core 11 is constructed of a plurality of core pieces 11a which are linked by intermediate thin-wall portions 11b and laminated together. Also, each of core pieces 11a is provided with tooth 13. Before being bent, stator core 11 has flat butt surface 15 and tongued-grooved portion 16 formed at each of two ends thereof. Motor stator 10 is constructed by bending thin-wall portions 11b of stator core 11 to form stator core 11 into an annular shape, joining the two ends of stator core 11 by welding, and forming slots 14 between adjoining teeth 13. Welded portion 17 in outer periphery 10a is located at center line 18 in a radial direction of slot 14.

In the conventional art discussed above, however, there is a problem that an efficiency of the motor decreases due to an increase in iron loss as a result of the welding of the ends of the core members, which breaks insulation films on both surfaces of the core members at the welded portion, electrically conducted between the core members, and then increases an eddy current.

PTL 1: Unexamined Japanese Patent Publication No. 2009-33874

SUMMARY OF THE INVENTION

A motor stator according to the present invention is provided with a laminated stator core comprising a plurality of core pieces having teeth and linked by intermediate thin-wall portions, the thin-wall portions being bent to form the stator core into an annular shape with two ends of the stator core joined by welding, and slots formed between adjoining pairs of the teeth, wherein a welded portion of the stator core is not near a center line in a radial direction of any of the slots.

It is by virtue of this structure to suppress an increase in iron loss attributable to the welding of the core ends, thereby providing a permanent-magnet brushless motor of high efficiency.

DETAILED DESCRIPTION OF THE PREFERRED EMBODIMENTS

Description will be provided hereinafter of exemplary embodiments of the present invention with reference to the accompanying drawings.

First Exemplary Embodiment

Figure 1:
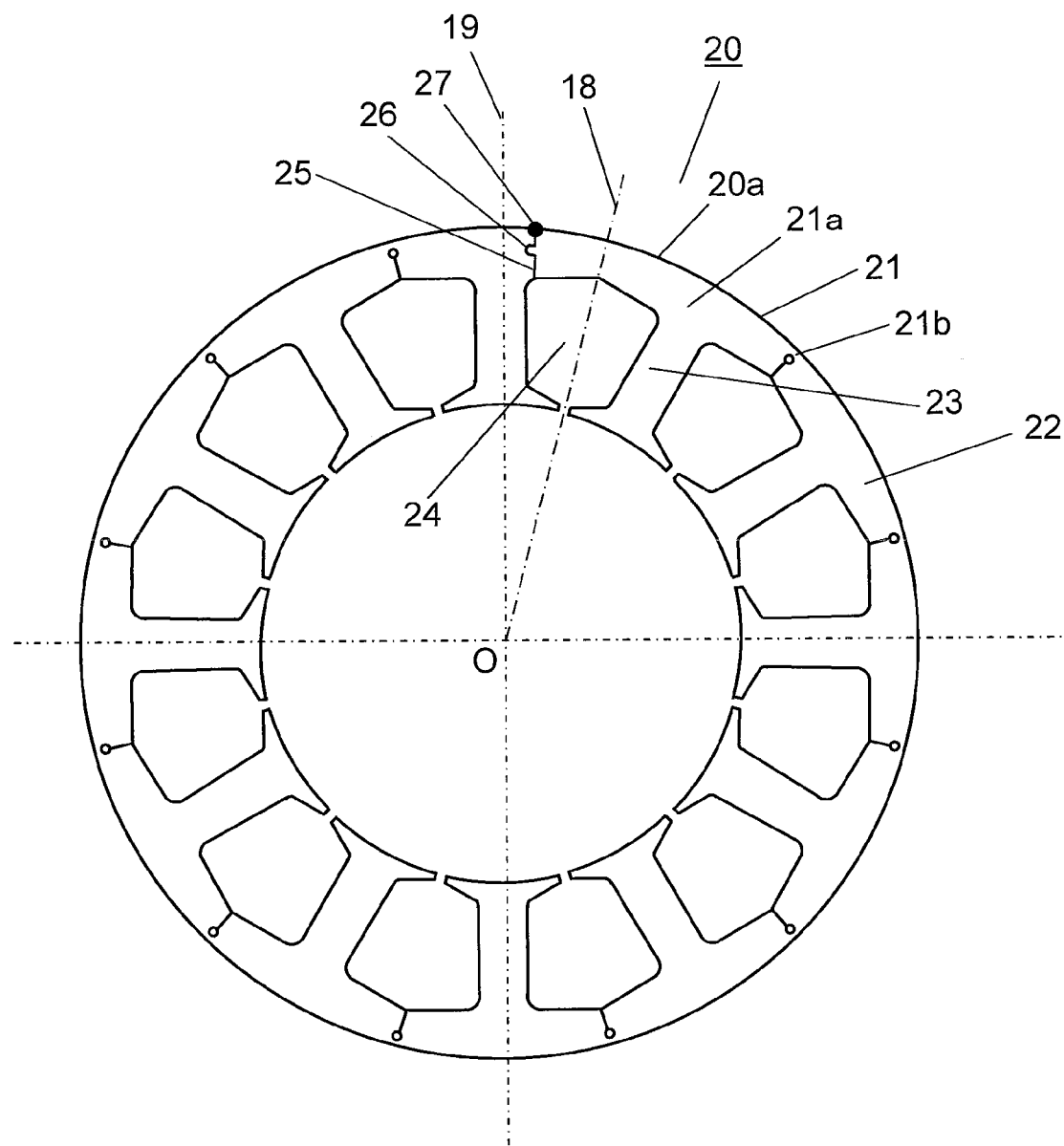
FIG. 1 is a plan view of a stator core of a permanent-magnet brushless motor after the stator core is bent, according to first exemplary embodiment of the present invention.

FIG. 1 is a plan view of a stator core of a permanent-magnet brushless motor after the stator core is bent, according to the first exemplary embodiment of the present invention. Stator core 21 is constructed of a plurality of core pieces 21a which are linked by intermediate thin-wall portions 21b and laminated together. In addition, each of core pieces 21a is provided with tooth 23. Before being bent, stator core 21 has flat butt surface 25 and tongued-grooved portion 26 formed at each of two ends thereof. Stator 20 of the motor is constructed by bending thin-wall portions 21b of stator core 21 to form stator core 21 into an annular shape, joining the two ends of stator core 21 by welding, and forming slots 24 between adjoining teeth 23.

Stator 20 constructed as discussed above has twelve teeth 23 disposed at regular intervals, yoke 22 extending circularly, and slots 24 formed between adjoining teeth 23. Welded portion 27 in outer periphery 20a of stator 20 is not near center line 18 in a radial direction of slot 24, but located at a position between center line 18 of slot 24 and center line 19 of tooth 23 in the radial direction.

Figure 2:
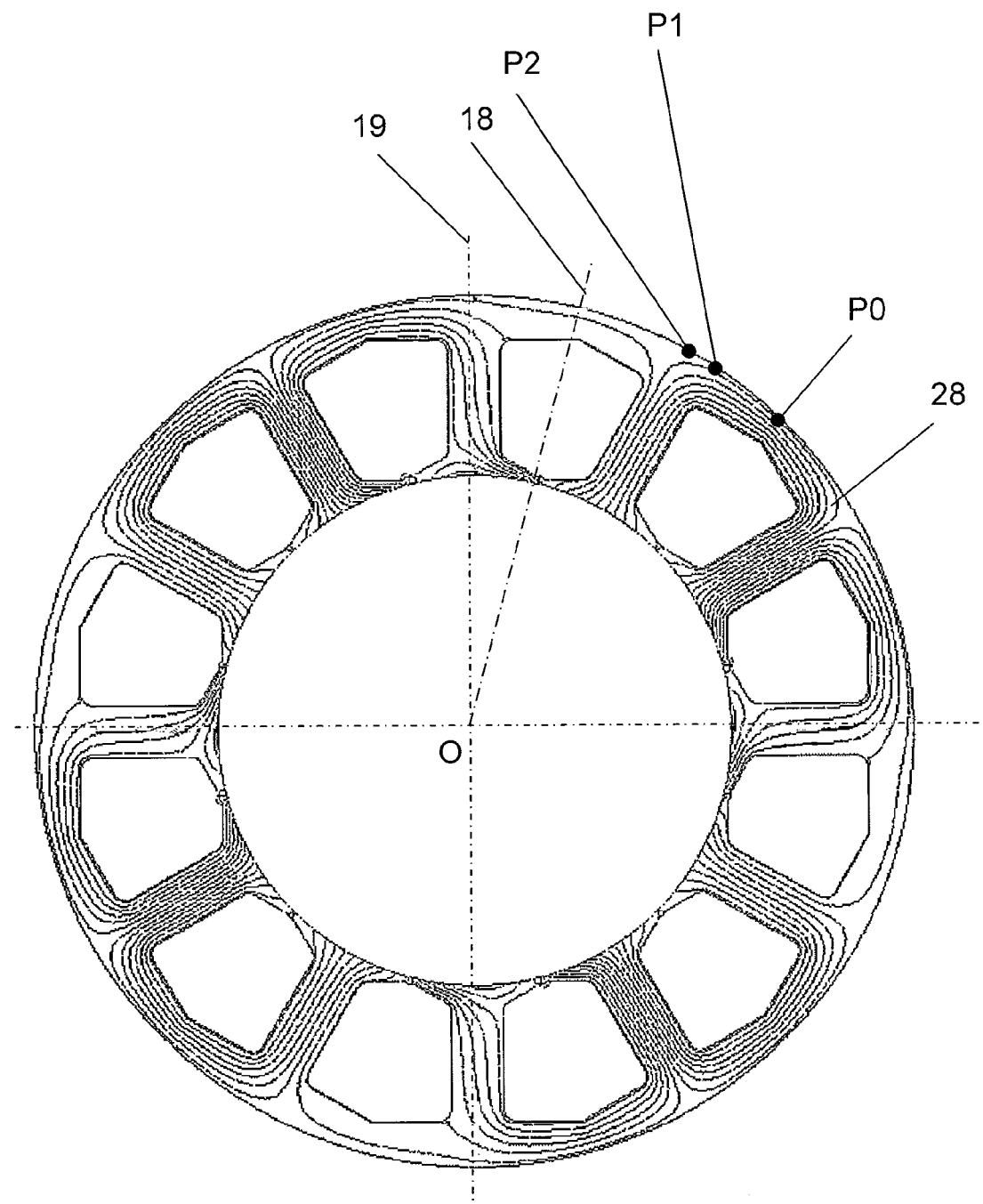
FIG. 2 is diagrammatic illustration showing an analytical calculation result of magnetic flux lines in the stator core according to the finite element method.

FIG. 2 is diagrammatic illustration showing an analytical calculation result of magnetic flux lines in the stator core according to the finite element method. As is evident from FIG. 2, an area along center line 18 of the slot and its vicinity is where the magnetic flux concentrates the most, and the concentration of magnetic flux 28 becomes gradually lessened with increasing distance from center line 18 of the slot toward center line 19 of the tooth. In other words, it is known that the magnetic flux density becomes the highest in the vicinity of center line 18 of the slot, and the magnetic flux density gradually decreases with distance from center line 18 of the slot toward center line 19 of the tooth. Since a magnitude of the eddy-current loss is proportional to the second power of the magnetic flux density of distributed magnetic flux 28, the iron loss can be reduced by welding at weld position P1 in this first embodiment instead of conventional weld position P0 on center line 18 of the slot.

Second Exemplary Embodiment

Figure 3:
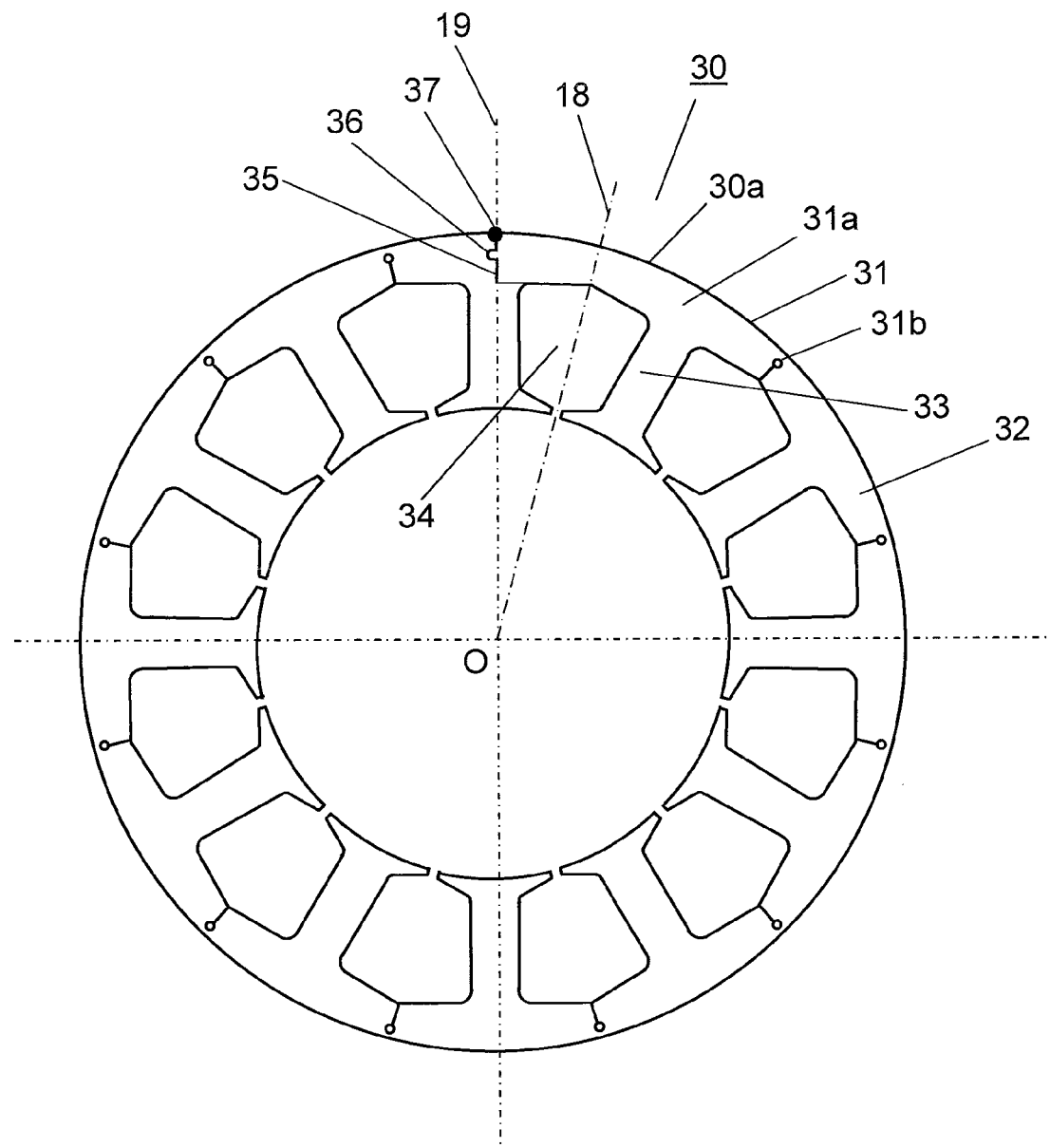
FIG. 3 is a plan view of a stator core of a permanent-magnet brushless motor after the stator core is bent, according to second exemplary embodiment of the present invention.

FIG. 3 is a plan view of a stator core of a permanent-magnet brushless motor after the stator core is bent, according to the second exemplary embodiment of the present invention. Stator core 31 is constructed of a plurality of core pieces 31a which are linked by intermediate thin-wall portions 31b and laminated together. In addition, each of core pieces 31a is provided with tooth 33. Before being bent, stator core 31 has flat butt surface 35 and tongued-grooved portion 36 formed at each of two ends thereof. Stator 30 of the motor is constructed by bending thin-wall portions 31b of stator core 31 to form stator core 31 into an annular shape, joining the two ends of stator core 31 by welding, and forming slots 34 between adjoining teeth 33.

Stator 30 constructed as discussed above has twelve teeth 33 disposed at regular intervals, yoke 32 extending circularly, and slots 34 formed between adjoining teeth 33. Before being bent, stator core 31 is provided with flat butt surface 35 and tongued-grooved portion 36 formed at each of the two ends thereof. Welded portion 37 on outer periphery 30a lies near center line 19 in a radial direction of tooth 33 which is a distance away from center line 18 in the radial direction of slot 34.

As in the case of the first exemplary embodiment, the magnetic flux density in the weld position decreases gradually with increasing distance from center line 18 of slot 34 toward center line 19 of tooth 33, as is obvious from FIG. 2. As discussed, the area near center line 19 of tooth 33 lies in a location where the magnetic flux is least likely to concentrate. It is therefore desirable in order to reduce the iron loss that the welding is made at weld position P2 according to this second embodiment rather than conventional weld position P0 on the center line of the slot.

Third Exemplary Embodiment

Figure 4:
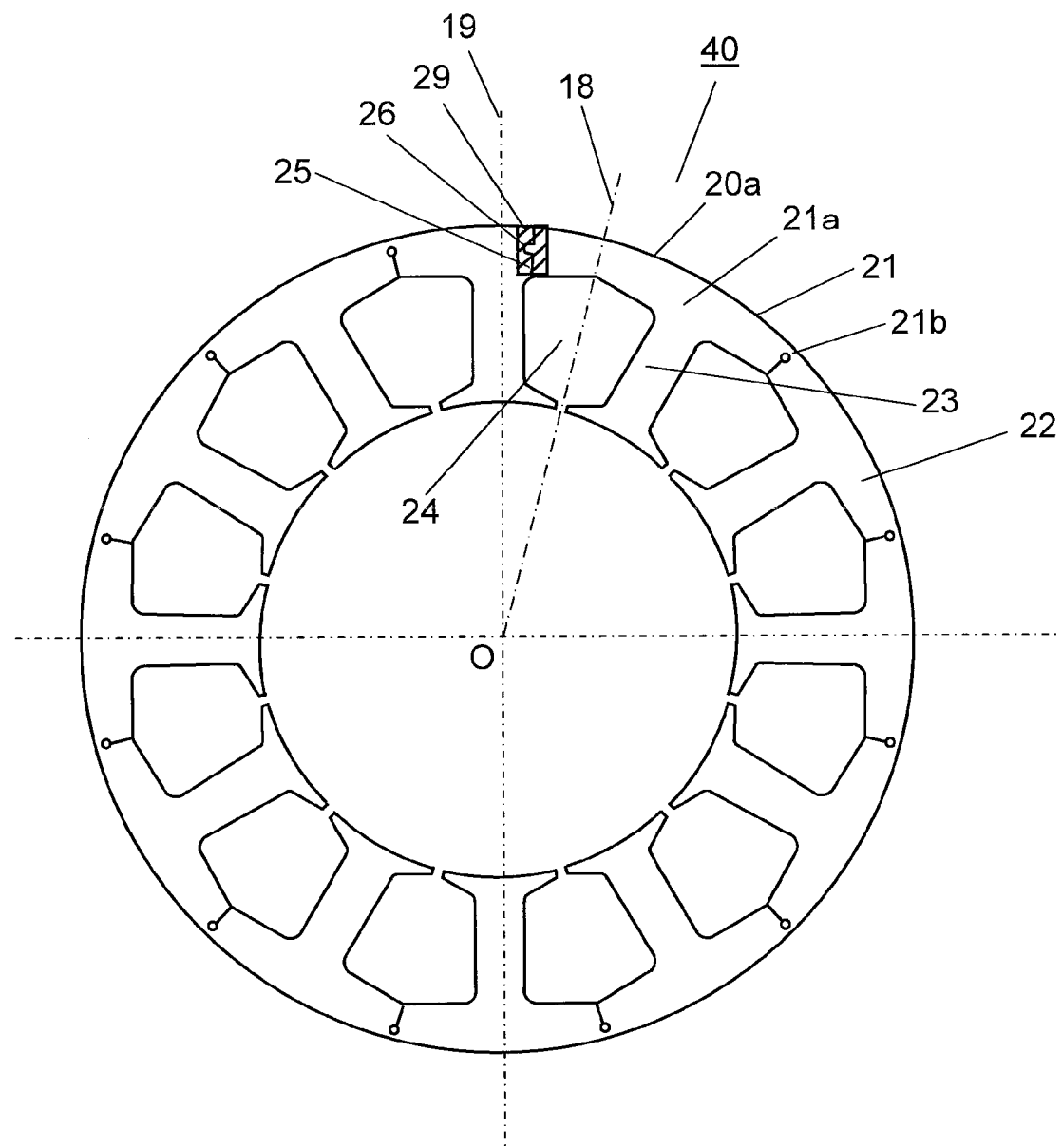
FIG. 4 is a plan view of a stator core of a permanent-magnet brushless motor after the stator core is bent, according to third exemplary embodiment of the present invention.
Figure 5:
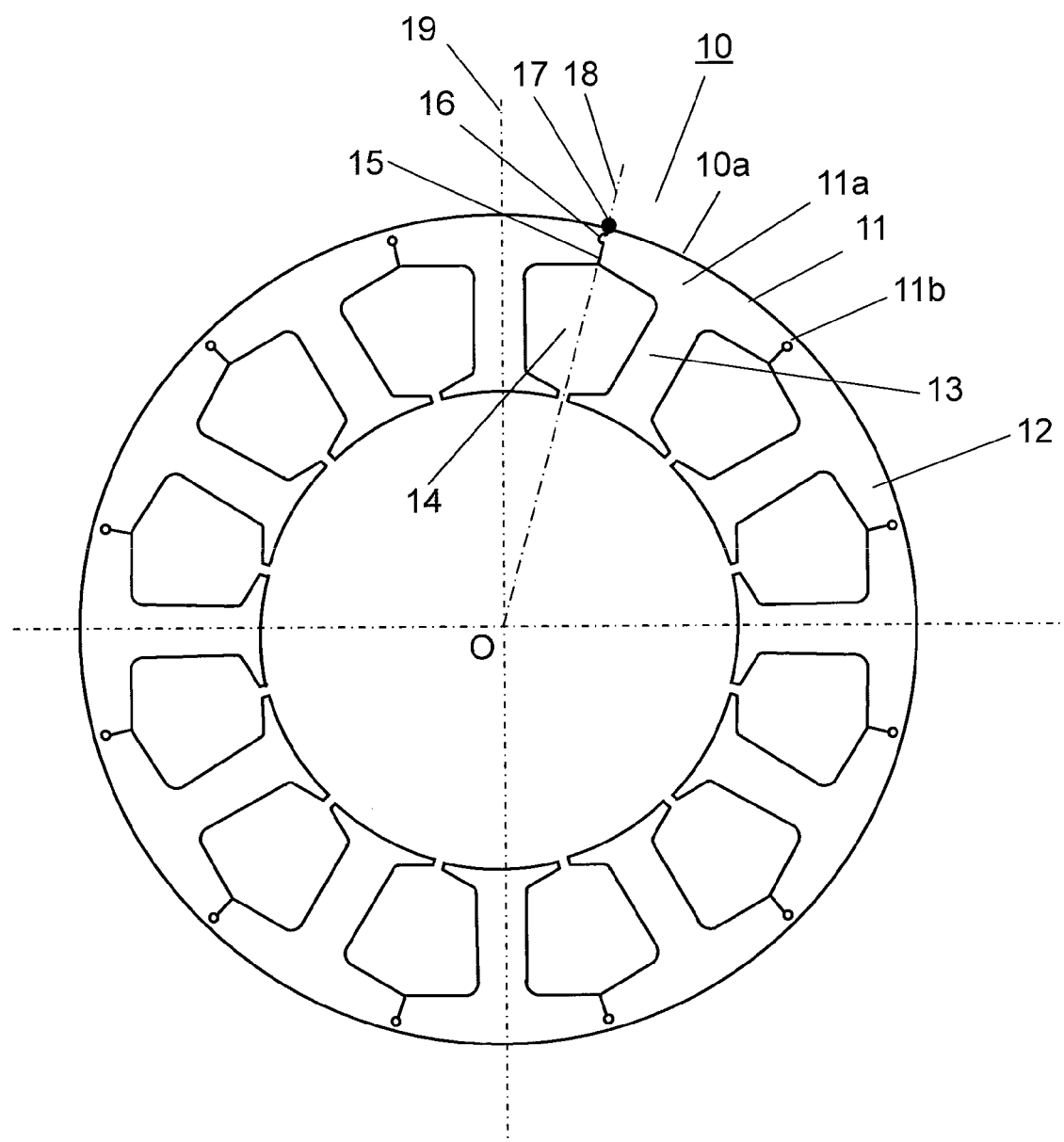
FIG. 5 is a plan view of a stator core of a conventional permanent-magnet brushless motor after the stator core is bent.

FIG. 4 is a plan view of a stator core of a permanent-magnet brushless motor after the stator core is bent, according to the third exemplary embodiment of the present invention. The third exemplary embodiment differs from the first and the second exemplary embodiments in the respect that the stator core is not welded but fixed by resin molding when joining two ends of the stator core. Since other structural components are identical to those of the first and the second embodiments, same reference marks are used to designate the same components as those of the first embodiment, and their details will be omitted.

As shown in FIG. 4, stator 40 of the third embodiment is constructed by bending thin-wall portions 21b of stator core 21 to form stator core 21 into an annular shape, joining the two ends of stator core 21 and fixing them with resin molding 29, and forming slots 24 between adjoining teeth 23. As discussed, stator 40 of the third embodiment uses resin molding to fix the two ends of stator core 21 instead of welding, thereby enabling it to eliminate an increase in the iron loss attributable to the welding of the core ends. A permanent-magnet brushless motor of high efficiency can be thus provided.

In addition, any of the stators in the above-described first through third exemplary embodiments, when used to make a permanent-magnet brushless motor, can suppress increase in the iron loss attributable to the welding of the core ends, and it can hence provide the permanent-magnet brushless motor of high efficiency.

INDUSTRIAL APPLICABILITY

The stator cores of permanent-magnet brushless motors according to the present invention are suitable for such applications as motor vehicles and home appliances for which high efficiency is needed, because of their ability of suppressing increase in the iron loss attributable to welding of the core ends as well as the capability of providing the permanent-magnet brushless motors of high efficiency.

The invention claimed is:

1. A motor stator provided with a laminated stator core comprising:
   a cylindrical outer wall integrally formed with a plurality of teeth extending radially inwardly from the outer wall at equal angular intervals, the teeth forming a slot between a respective pair of two adjacent teeth, wherein
   the outer wall is formed with a circular series of core pieces each comprising a radially inwardly extending tooth and with a radially extending bend mark cut communicating only with an inner periphery of the outer wall at a circumferential center of a respective pair of two adjacent teeth, except for only one pair of two adjacent first and second core pieces, between which no bend mark cut is formed, connected to each other via a connection portion that is the sole connection portion along the entire outer wall and communicates with both an outer periphery and the inner periphery of the outer wall, wherein a respective one of the core pieces, except for the one pair of two adjacent first and second core pieces, is defined between two adjacent bend mark cuts and shaped symmetrically with respect to the tooth of the respective one, and the first and second core pieces are each shaped asymmetrically with respect to the tooth thereof,
   the connection portion comprises closely contacted first and second connection surfaces complementary in shape to each other, the first surface being formed in the first core piece and comprising (i) a first radial surface running radially straight along a circumferential center of the tooth of the first core piece from the outer periphery of the outer wall through a terminal end thereof located inside the outer wall and (ii) a first circumferential surface running circumferentially only in a single direction towards the second core piece from the terminal end of the radial surface and extending contiguously to the inner periphery of the outer wall between the teeth of the first and second core pieces, and
   the second surface being formed at a circumferential end of the second core pieces and comprising (a) a second radial surface being in complementary contact with the first radial surface of the first core piece such that the second radial surface runs radially inwardly along the first radial surface from the outer periphery of the outer wall and terminates at the terminal end of the first radial surface and (b) a second circumferential surface being in complementary contact with the first circumferential surface of the first core piece such that the second circumferential surface runs circumferentially along the first circumferential surface from the terminal end of the first radial surface and extends contiguously to the inner periphery of the outer wall between the teeth of the first and second core pieces.
2. The motor stator of claim 1, wherein the connection portion is welded.
3. A motor provided with the stator as defined in claim 2.
4. A motor provided with the stator as defined in claim 2.
5. A motor provided with the stator as defined in claim 1.
6. The motor stator of claim 1, wherein the connection portion is resin molded.

* * * * *